United States Patent [19]

Davis et al.

[11] Patent Number: 4,813,761
[45] Date of Patent: Mar. 21, 1989

[54] HIGH EFFICIENCY SPATIAL MASKS

[76] Inventors: Jeffrey A. Davis, #56 5430 Baltimore Dr., La Mesa, Calif. 92042; Glenn W. Bach, 4646 Valencia Dr.; Don M. Cottrell, 5111 Manhasset Dr., both of San Diego, Calif. 92115; Roger A. Lilly, 6362 Casselberry Way, San Diego, Calif. 92119

[21] Appl. No.: 120,980

[22] Filed: Nov. 16, 1987

[51] Int. Cl.$^4$ .............. G02B 27/46; G02B 5/30; G02B 5/32; G06G 7/02
[52] U.S. Cl. .............. 350/162.15; 350/376; 350/162.12; 350/3.7; 364/825
[58] Field of Search ............. 350/162.12–162.14, 350/3.6, 3.7, 376, 380, 162.15, 378; 364/822, 825

[56] References Cited

U.S. PATENT DOCUMENTS 4,339,176 7/1982 Lee .................. 350/162.12

Primary Examiner—Bruce Y. Arnold
Attorney, Agent, or Firm—Lyon & Lyon

[57] ABSTRACT

A blazed output for a grating or filter is obtained by writing the real part of a complex function on a first portion of a recording medium and the imaginary part on a second portion of the recording medium, and introducing a phase shift between the first portion and second portion. A spatial light modulator, such as a magneto optic spatial light modulator (MOSLM) is preferably divided along the diagonal bisector of the MOSLM. The Fourier transform of the input function is taken and the cosine transform is written on the MOSLM to one side of the bisector and the sine transform is written on the other side of the bisector. A 90° phase shift is introduced between the two halves of the MOSLM, for example, through use of a quarterwave plate arrangement. An analyzer polarizer converter provides a binarized output. Blazing may be achieved such that substantially all of incident light may be directed into a desired order. Light may be uniquely and dynamically directed as for example in optical interconnects. Optical pattern recognition may be accomplished by eliminating undesirable recognitions of inverted objects.

31 Claims, 3 Drawing Sheets

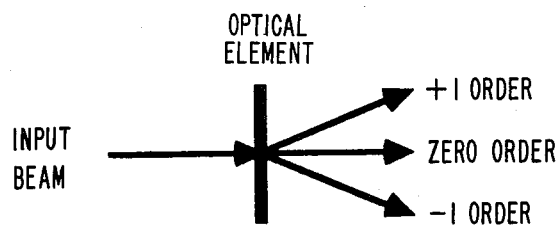
FIG. 1a.
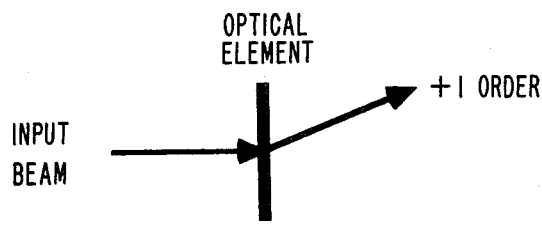
FIG. 1b.
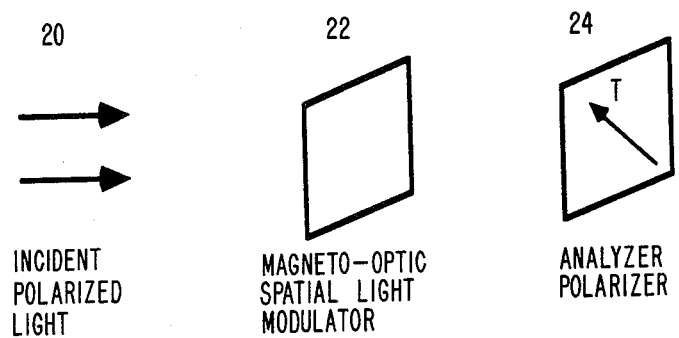
FIG. 2.
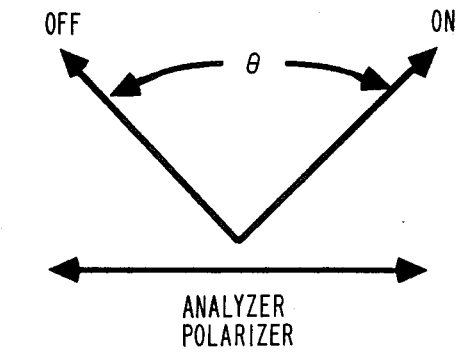
FIG. 2a.

HIGH EFFICIENCY SPATIAL MASKS

FIELD OF THE INVENTION

This invention relates to the making of high efficiency spatial masks. In particular, this invention relates to making high efficiency or blazed programmable diffraction gratings, holograms, holographic optical elements, and binary phase only filters using a programmable spatial light modulator.

BACKGROUND

Optical elements have long been used to diffract light. A common diffraction grating will diffract light according to the well known formula $n\lambda = d \sin \theta$ where n is the order, $\lambda$ is the wavelength, d is the grating spacing and $\theta$ is the angle from normal to the grating. Light will continue on in the original direction into the 0 order, as well as all other orders. Considering only the first order, light will be diffracted into both the +1 and −1 orders. FIG. 1A shows the relationship of the incident light to the +1, 0 and −1 orders.

It is often desired to send light off only in one direction, say in the direction of the +1 order, as shown in FIG. 1B. If a diffraction grating is used to direct the light, some light will necessarily also be directed into the −1 order, an assumed undesired direction. Indeed, any recording medium which records only the amplitude of the diffraction grating will direct light into both a desired and an assumed undesired direction. The optical efficiency of such a device is less than one which directed light solely into the desired direction.

By may of example, this effect occurs in holograms recorded with ordinary film. Upon illumination the original image used to record the hologram is seen. Additionally, a second pseudoscopic image is also formed in the opposite direction and a zero order component is transmitted.

An optical element or grating which records only phase can direct light exclusively into the +1 order eliminating the −1 and 0 orders. All of the incident energy may be directed into the desired direction. Gratings in which the maximum diffracted intensity occurs at one of the nonzero orders are hereby defined as "blazed" gratings for this invention. It is known in the art that reflection diffraction gratings may be constructed by providing a sawtooth stepped reflection surface. Blazed transmission gratings may be made holographically, by using dichromated gelatin for the recording medium, or as a Fresnel lens made, for example, of plastic. The main disadvantage of these techniques is that the recording medium is permanently encoded. They are not programmable.

Programmable optical elements exist. One class of such elements are spatial light modulators (SLMs). Generally, however, SLMs record only amplitude. One particular type of SLM is a magneto-optic spatial light modulator (MOSLM). A MOSLM consists of a two dimensional mosaic of individual magneto-optic cells. Each cell can be magnetized either parallel or anti-parallel to the direction of light propagation. this magnetization state then rotates the plane of polarization of linearly polarized light either counterclockwise or clockwise. The amount of light which passes through a second polarizer will then depend on the orientation of a downstream polarizer.

The effects of the MOSLM are shown in FIG. 2. Polarized light 20 is incident upon a MOSLM 22. The magnetization of the MOSLM 22 will be one of two directions. A analyzer polarizer 24 is placed downstream of the MOSLM 22. If the analyzer polarizer 24 is oriented to block the light rotated to the OFF direction, then the +1, −1 and 0 orders will be transmitted. However, if the analyzer polarizer 24 is oriented normal to the bisector of the ON and OFF states, as shown in FIG. 2A, only a +1 and a −1 component is transmitted. In this way the incident polarized light 20 has been converted by the MOSLM 22 and filter 24 into a beam reflecting only phase information from the pattern on the MOSLM 22. If the amplitudes of the +1 and −1 orders are equal, the MOSLM becomes a binary phase only grating. In this way the 0 order may be eliminated. However, the assumed undesirable −1 order remains.

SUMMARY OF THE INVENTION

The technique and apparatus of this invention allows a larger fraction of incident energy to perform a desired optical function, thereby reducing the amount of energy in undesirable functions, for example the 0 and −1 orders in the case of a diffraction grating. In generating a filter for an input function f(x, y), a two dimensional transform, preferably a Fourier transform, F(u, v) is generated. The Fourier transform F(u, v) will have a real part C(u, v) and an imaginary part S(u, v). If a Fourier transform is used C(u, v) is the cosine transform and S(u, v) is the sine transform. A blazed filter is constructed by using a linear combination of the cosine and sine filters as $$C(u,v) - iS(u,v)$$

In accordance with the teachings of this invention the cosine transform C(u, v) is written on one portion of the grating and the sine transform S(u, v) is written on another portion of the grating. In the preferred embodiment the cosine transform C(u, v) is written onto one half of the MOSLM divided diagonally, and the sine transform is written on the other side of the diagonal. A 90° phase shift, or an odd multiple thereof, is then introduced between the two portions of the screen, In the preferred embodiment, a quarter wave plate is used to introduce a 90° phase shift between the two portions of the screen.

In the preferred embodiment, the overall apparatus would be as follows. Linearly polarized light is incident upon a MOSLM. The Fourier transform of the desired input function is written on the MOSLM such that the real portion is written in one half of the MOSLM to one side of the diagonal, and the imaginary part is written on the other side. A 90° phase shift is introduced between the two regions, for example, by a quarter wave plate arrangement. The Fourier transform is then taken, for example, through use of a lens, or using a Fresnel lens encoded onto the MOSLM.

In accordance with the teachings of this invention a principal application is in directing light. Specifically, incident light may be dynamically directed using SLMs into a desired direction or directions, while eliminating or reducing the amount of light sent to undesired directions. In this way the light may be uniquely directed in desired directions, for example, for use in writing patterns, for optical communications or in optical interconnects.

Further, in optical pattern recognition applications the +1 and −1 diffracted information allow recognition of an upright object as well as an inverted object. Application of this invention will eliminate detection of the inverted object since the −1 diffracted information is eliminated. In this way a unique identification of a pattern in possible.

Accordingly, the principla object of this invention is to provide blazed programmable gratings.

Another object is to effectively write a complex function onto an object capable of only recording amplitude.

Another object of the present invention is to provide a method and apparatus for directing a beam or beams, such as in an optical interconnect apparatus.

Another object of the present invention is to provide a method and apparatus for dynamically directing a beam or beams, such as in an optical interconnect apparatus.

Another object of this invention is to provide a programmable holographic element.

Yet another object of this invention is to provide an improved pattern recognition apparatus and method.

These and other objects and advantages of the present invention will become more clear upon reference to the accompanying drawings and the following detailed description:

BRIEF DESCRIPTION OF THE DRAWINGS

FIG. 1A is a plan view of a non-blazed optical element.

FIG. 1B is a plan view of a blazed optical element.

FIG. 2 is a perspective view of a MOSLM and polarizer.

FIG. 2A shows the output polarization states of an MOSLM and analyzer polarizer orientation to achieve bipolar modulation.

DETAILED DESCRIPTION

Consider first the recording of a one dimensional sinusoidal diffraction grating on a SLM as $$t(x) = A + B \cos(2\pi\lambda x) + C \sin(2\pi\lambda x)$$

where $\lambda = 1/d$ and d is the period of the grating. This can be rewritten using Euler's formula as $$t(x) = A + \frac{B}{2}[e^{i2\pi\gamma x} + e^{-i2\pi\gamma x}] + \frac{C}{2i}[e^{i2\pi\gamma x} - e^{-i2\pi\gamma x}].$$

The Fourier transform of t(x) is $$T(u) = A(u) + \frac{B}{2}[\delta(u - \gamma) + \delta(u + \gamma)] +$$

$$\frac{C}{2i}[\delta(u - \gamma) - \delta(u + \gamma)].$$

where u is the spatial frequency. The intensity distribution consists of three spots whose magnitudes depend upon the values of A, B and C, whose angular locations are given by u=0, u=+λ and u=−λ, as shown in FIG. 1A.

If A=0 and C=iB then the transformed function becomes $$T(u) = B\delta(u - \lambda),$$

providing a blazed output, as shown in FIG. 1B. That is the zero order and −1 order terms are eliminated.

With these conditions, the input function can be written in a normalized fashion as $$t(x) = \cos(2\pi\lambda x) + i \sin(2\pi\lambda x) = e^{i2\pi\lambda x}.$$

In this way a blazed output of a single order is obtained. However, amplitude recording media are incapable of recording a complex function.

In accordance with one embodiment of this invention, the two dimensional recording medium is divided into two portions. The cosine grating is written onto one portion and the sine grating is written onto the other portion. The 90 degree phase shift is then introduced between the two portions of the recording medium.

More generally this invention contemplates the writing of a one or more dimensional complex function by writing the real part on one portion of a recording medium, and by writing the imaginary part on another portion. The required phase shift is then introduced between the two portions of the recording medium.

In one embodiment of this invention, in generating a filter for an input function f(x, y) a two dimensional transform, preferably a Fourier transform, F(u, v) is generated. The Fourier transform F(u, v) will have a real part C(u, v) and an imaginary part S(u, v). The real part is then written onto one half of a SLM divided diagonally and the imaginary part is written on the remainder of the SLM. A quarter wave plate arrangement may be used to provide the required phase shift.

Figure 3:
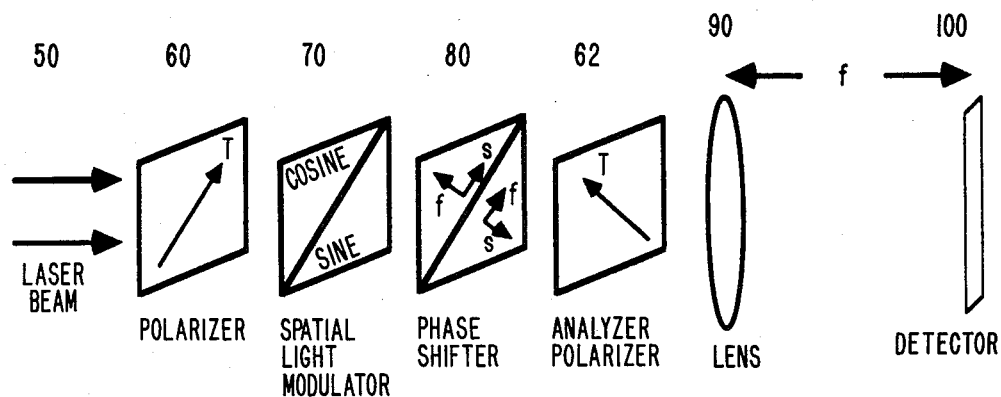
FIG. 3 is a system overview of a system for achieving blazing using a spatial light modulator.

An overview of the system is shown in FIG. 3. A beam of light 50 is sent through a polarizer 60. A spatial light modulator 70 is provided onto which the cosine transform of the input function has been written to one side of a diagonal bisector and the sine transform has been written on the other side of the diagonal bisector. An analyzer polarizer 62 is oriented with its axis perpendicular to the bisector of the two states of the spatial light modulator 70. A phase shifter 80 introduces a 90° phase shift relative to the sides of the diagonal bisector. A lens 90 and detector 100 are spaced apart by the focal length of the lens 90. In this way the Fourier transform of the radiation incident upon the lens 90 is obtained at the detector 100. An alternative to the use of lens 90 is to incorporate a holographic optical element within the pattern written on the spatial light modulator 70.

While the specific components and ordering thereof have been described in the preferred arrangement, equivalent components and alternative orderings as known to those skilled in the art may be used to achieve the desired results.

In one embodiment a linearly polarized helium neon laser beam is expanded and collimated. It then passes through the linear polarizer 60 with its axis of polarization parallel to one of the principal axes of the phase shifter.

While the technique of this invention is usable with permanent, non-programmable masks, it is particulary useful for programmable masks. One particularly useful programmable mask is a class of devices denominated spatial light modulators. This invention has been implemented with a magneto-optic spatial light modulator. MOSLM are available, for example, from Semetex Corporation. A MOSLM consists of a two dimensional mosaic of individual magneto-optic square cells. Each cell can be magnetized either parallel or anti-parallel to the direction of light propagation. This magnetization state then rotates the plane of linearly polarized light either counterclockwise or clockwise. The polarization axis for linearly polarized transmitted light is rotated as it passes through any activated element, defined as the ON state, relative to an unactivated element, defined as the OFF state. Some SLMs permit only the recording of binarized information, that is, where the function to be encoded is made $+1$ if it is positive and $-1$ if it is negative. However, the invention is applicable to recording media or SLMs which permit the recording of continuous or binarized information. Such recording media or SLMs would include photographic film, liquid crystal spatial light modulators, microchannel spatial light modulators, and PLZT spatial light modulators.

The Semetex MOSLM may be controlled by a computer as is known to those skilled in the art. The input function is Fourier transformed by the computer. The real part of the Fourier transform, that is, the cosine transform, is written by the computer on a portion of the MOSLM. The imaginary position is written on the remainder of the MOSLM.

A variety of patterns may be employed. The preferred embodiment consists of dividing the MOSLM along a diagonal bisector and writing the cosine transform on one side and the sine transform on the other. However, other divisions of the mask can be used in accordance with this invention. For example, the mask may be divided into halves, either right and left or up and down. Alternatively, a pie shaped sectioning may be used. The cosine transforms are written on alternate sections and the sine transforms are written on the remaining sections. Blazine has been theoretically confirmed with the use of 48 pie shaped slices on the mask. Alternatively, a checkerboard pattern may be used.

The amount of light which passes through a second polarizer 62 depends upon its orientation. If the analyzer polarizer 62 is oriented perpendicular to the OFF polarization state, transmission will be blocked for the OFF elements. Transmission will occur for the ON state. The individual areas of the SLM 70 can be made ON or OFF and the transmitted patterns will consist of both light and dark areas.

Bipolar phase modulation can be obtained by orienting the analyzer polarizer 62 perpendicular to the bisector of the ON and OFF polarization states. The electric field vector for the transmitted light is polarized to the left for the OFF state and to the right for the ON state. There is a 180° phase shift between the ON and OFF states. The ON state is defined as $+1$ and the OFF state is defined as $-1$. In this case, the transmitted beam will visually not appear to have nay pattern on it since intensity rather than electric field is viewed.

Figure 4:
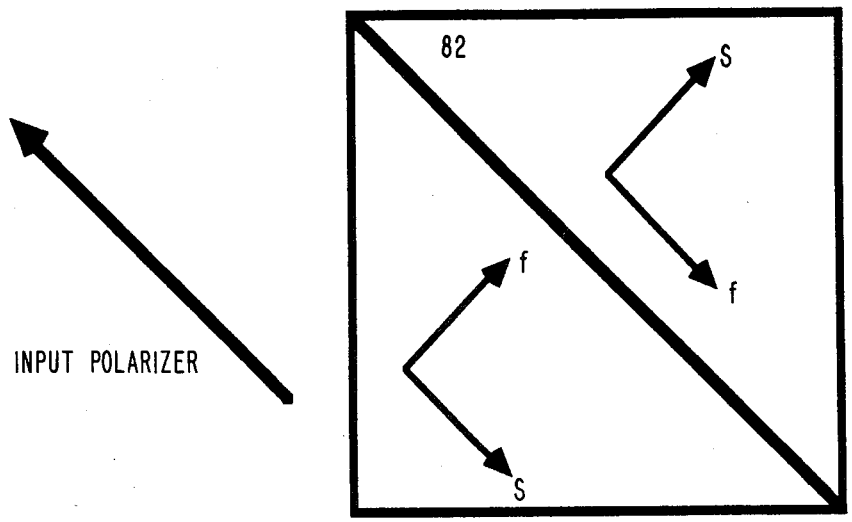
FIG. 4 is a quarter wave plate arrangement to implement a phase change.

The necessary phase change can be implemented in a variety of ways. One implementation utilizes two quarter wave phase plates oriented as shown in FIG. 4. On the top right half of the screen 82 we place a quarter wave plate whose FAST axis is oriented parallel to the diagonal bisector. In the lower left half of the screen 84, a similar quarter wave plate is oriented with its FAST axis perpendicular to the diagonal bisector. If linearly polarized light is incident on this optical element polarized parallel (or perpendicular) to the diagonal bisector then the optical path length between light passing through the halves will differ by a quarter wavelength and is equivalent to a 90° phase change. The thickness of the plate must satisfy $d=\lambda/2\ (n_s-n_f)$ where $n_s$ and $n_f$ and the indices of refraction of the waveplate at the design wavelength.

Figure 5:
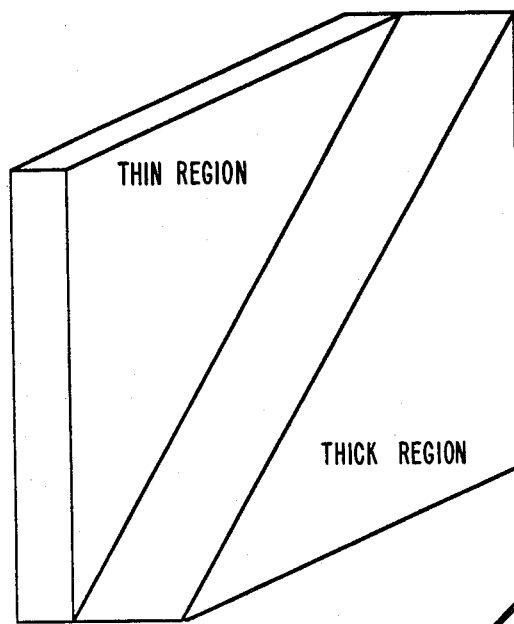
FIG. 5 is an alternative embodiment for implementing a phase change.

A second implementation of this technique is shown in FIG. 5 and utilizes a piece of an optically clear non-birefringent material such as glass. The thickness of the glass is different for the top left and lower right halves and introduces a quarter wave difference in the optical path length. Assuming light of wavelength $\lambda$ is used with a piece of glass having an index of refraction of n, the desired difference in thickness d is $d=\lambda/2(n-1)$ where n is the index of refraction for the piece of glass at the design wavelength. This technique can be suitably modified to provide the appropriate phase shifts in those regions corresponding to the two transforms.

Referring to FIG. 3, light is then passed through a lens 90 arranged to provide a Fourier transform. In the preferred embodiment a lens with 75 cm focal length was used. A detector 100, such as a photo diode array is placed in the focal plane of the lens 90.

We have found that the results obtained are sensitive to the optical flatness of the optical elements used including the optical polarizers, quarter wave plates and SLMs. The blazing effect was sensitive to the angular orientation and position of the phase shifter relative to the 45° dividing line on the MOSLM. The blazing effect is diminished if the incident beam intensity is non-uniform over the face of the SLM. The blazing effect is also sensitive to the wavelengths at which the quarter wave plates are cut.

Figure 6:
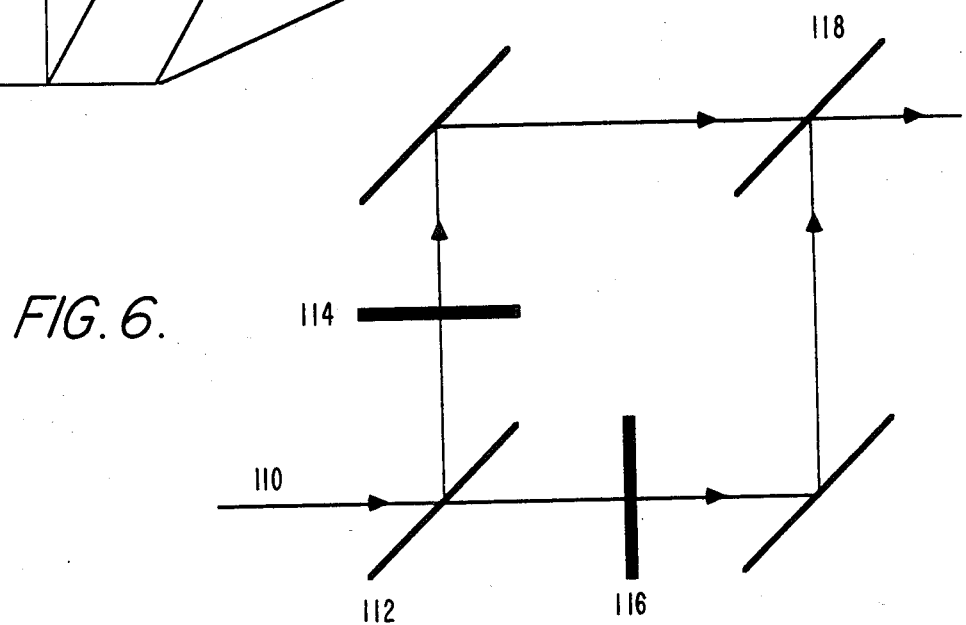
FIG. 6 is a plan view of an interferometer based system employing the instant invention.

An alternate embodiment using two gratings in shown in FIG. 6. A Mach Zehnder interferometer is used to split the incident beam 110 via a first beam splitter 112. One beam passes through a spatial light modulator 114 onto which the cosine grating is written. The other beam passes through a second spatial light modulator 116 on which the sine grating is written. The two beams are then combined using a second beam splitter 118. A 90° phase shift between the sine grating 116 and cosine grating 114 can be achieved by varying the optical path length difference.

While the subject invention has been described with respect to a MOSLM, the technique is general. Indeed, the technique may be used with non-programmable media such as film. The invention may be used with nay type of transmissive and reflective recording media or SLMs.

While there are many practical applications of the blazed filters of the invention, one key application relates to the directing of a light. Two such applications involve directing light to write a message. It is desireable to suppress to 0 order and $-1$ order term to eliminate undesirable images. By varying the spacing between the gratings of the input function, the location of the $+1$ order will move in space. Similarly, optical interconnects may be made in which one or more input beams may be switched to one or more output detectors.

Figure 7:
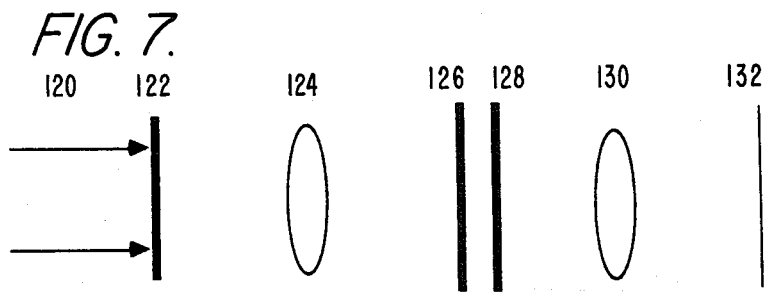
FIG. 7 is a system overview of a optical correlator employing the instant invention.

Another application of this invention is as an optical correlator. The system provides a real time automated optical correlator for printed media or physical objects. One implementation of such a correlator is shown in FIG. 7. A collimated laser beam 120 illuminates a spatial light modulator 122 containing a pattern to be recognized. The Fourier transform of this is taken by the first lens 124 and is multiplied by a Fourier transform written onto a second spatial light modulator 126. Here, the real and imaginary parts of the Fourier transform are written on the separate portions of the SLM as described earlier. The light passes through the phase shifter 128 and the product is again Fourier transformed by lens 130. The output screen 132 shows the correlation between the input pattern and the pattern used in the making of the filter as a bright spot of light. Through use of this invention, inverted occurrences of the input pattern are not recognized.

Though the invention has been described with respect to specific preferred embodiments thereof, many variations and modifications will become apparent to those skilled in the art. It is therefore the intention that the appended claims be interpreted as broadly as possible in view of the prior art to include all such variations and modifications.

What is claimed is:

1. A blazed optical filter for a complex input function of an optical processor comprising:
    a spatial light modulator whose surface is divided into at least a first region and a second region, the first region containing the real portion of the input function, the second region containing the imaginary portion of the input function, and
    a phase shifter for shifting the phase of light from the first region relative to the second region.

2. The blazed optical filter of claim 1 wherein the first region is that area of the spatial light modulator which is disposed to one side of a diagonal bisector of the spatial light modulator, and the second region is that area of the spatial light modulator which is disposed to the other side of the diagonal bisector of the spatial light modulator.

3. The blazed optical filter of claim 1 wherein the first region and second region are pie shaped regions of the spatial light modulator.

4. The blazed optical filter of claim 3 further comprising a plurality of pie shaped regions alternately containing the same information as contained in the first and second regions.

5. The blazed optical filter of claim 1 wherein the first region is that area of the spatial light modulator which is disposed to one side of a horizontal bisector of the spatial light modulator, and the second region is that area of the spatial light modulator which is disposed to the other side of the horizontal bisector of the spatial light modulator.

6. The blazed optical filter of claim 1 wherein the first region is that area of the spatial light modulator which is disposed to one side of a vertical bisector of the spatial light modulator, and the second region is that area of the spatial light modulator which is disposed to the other side of the vertical bisector of the spatial light modulator.

7. The blazed optical filter of claim 1 wherein the spatial light modulator is a magneto-optic spatial light modulator.

8. The blazed optical filter of claim 1 wherein the spatial light modulator is a liquid crystal device.

9. The blazed optical filter of claim 1 wherein the real portions and imaginary portions of the input function are binarized.

10. A blazed optical filter for a multi-dimensional input function of an optical processor comprising,
    a first spatial light modulator upon which a two-dimensional spatial pattern is impressed,
    a second spatial light modulator on which a second two-dimensional spatial pattern is impressed,
    a beam splitter for supplying radiation to the first and second spatial light modulators,
    means to introduce a phase shift between the radiation to the first and second spatial light modulator.

11. The blazed optical filter of claim 10 wherein the first pattern and second pattern are binarized.

12. A method for recording phase information as well as amplitude information for a complex function using only amplitude recording media comprising:
    writing the real part of the function on first portions of the recording medium,
    writing the imaginary part of the function on second portions of the recording medium, and
    introducing a phase shift between light passed through the first portions and second portions of the recording medium.

13. The method of claim 12 wherein the recording medium is a spatial light modulator.

14. The method of claim 13 wherein the spatial light modulator is a magnetic optic spatial light modulator.

15. The method of claim 13 wherein the spatial light modulator is a liquid crystal spatial light modulator.

16. The method of claim 12 wherein the real part and the imaginary part of the function are binarized.

17. The method of claim 12 wherein the phase shift between light passed through the first portions and the second portions of the recording medium is 90 degrees.

18. A method of using a blazed optical filter in an optical processor having input function comprising:
    inputting a beam of linearly polarized laser light,
    optically phase shifting a first portion of the beam relative to a second portion of the beam,
    writing the sine portions and cosine portions of the Fourier transform of the input function on different portions of a spatial light modulator,
    passing the different portions of the beam through the different portions of the spatial light modulator,
    passing the beam through an analyzer polarizer, and
    optically Fourier transforming the beam using a lens.

19. The method of claim 18 wherein the optical Fourier transforming lens is encoded on a spatial light modulator.

20. The method of claim 18 in which the sine portions and cosine portions of the Fourier transform are binarized.

21. A method of using a blazed optical filter in an optical processor having an input function comprising:
    inputting a beam of linearly polarized laser light,
    writing the sine portions and cosine portions of the Fourier transform of the input function on different portions of a spatial light modulator,
    passing the different portions of the beam through the different portions of the spatial light modulator,
    optically phase shifting a first portion of the beam relative to a second portion of the beam,
    passing the beam through an analyzer polarizer, and
    optically Fourier transforming the beam using a lens.

22. A blazed binary optical filter for an input function of an optical processor comprising:
    a source of linearly polarized laser light,
    a programmable polarization rotating spatial light modulator onto which the cosine portions and the sine portions of the Fourier transform of the input function are separately written, an optical phase shifter to shift the relative phase between light passing through the cosine portions and the sine portions, and an analyzer polarizer.

23. The blazed binary optical filter of claim 22 wherein the cosine portions and sine portions are binarized.

24. A blazed optical filter and a complex input function of an optical processor comprising, a first spatial light modulator upon which a pattern is impressed, a second spatial light modulator on which a second pattern is impressed, a beam splitter for supplying radiation to the first and second spatial light modulators, means to introduce a substantially 90° phase shift between the radiation to the first and second spatial light modulator.

25. A blazed optical filter for an input function of an optical processor comprising, a first spatial light modulator upon which a pattern is impressed, a second spatial light modulator on which second pattern is impressed, a beam splitter for supplying radiation to the first and second spatial light modulators at the same angle of incidence, means to introduce a phase shift between the radiation to the first and second spatial light modulator.

26. The blazed optical filter of claim 25 wherein the angle of incidence of the radiation from the beam splitter and said first and second light modulators is substantially 90°.

27. A method for recording phase information as well as amplitude information for a multidimensional function using only amplitude recording media comprising:

writing the real part of the function on a first recording medium, writing the imaginary part of the function on a second recording medium, and introducing a phase shift between light passed through the first recording medium and the second recording medium.

28. A method for recording phase information as well as amplitude information for a complex function using only amplitude recording media comprising:

writing the real part of the function on a first recording medium, writing the imaginary part of the function on a second recording medium, and introducing a substantially 90° phase shift between light passed through the first recording medium and the second recording medium.

29. A method for recording phase information as well as amplitude information for a complex function using only amplitude recording media comprising:

writing the real part of the function on a first recording medium, writing the imaginary part of the function on a second recording medium, introducing a phase shift between light passed through the first recording and second recording medium wherein said beams are incident on said mediums at substantially the same angle of incidence.

30. The method of claim 27 wherein the angle of incidence of the light with the first recording medium and the second recording medium is substantially 90°.

31. A method for recording phase information as well as amplitude information for a complex function using only amplitude recording media comprising:

writing the real part of the function a first recording medium, writing the imaginary part of the function on a second recording medium, and introducing a phase shift between light passed through the first recording medium and the second recording medium by varying the optical path length between the light incident on the first recording medium and the second recording medium.

* * * * *

UNITED STATES PATENT AND TRADEMARK OFFICE
CERTIFICATE OF CORRECTION

PATENT NO. : 4,813,761

DATED : March 21, 1989

INVENTOR(S) : Jeffrey A. Davis; Glenn W. Bach; Don M. Cottrell & Roger A. Lilly

It is certified that error appears in the above—identified patent and that said Letters Patent is hereby corrected as shown below:

Column 3, line 6, "principla" should be "principle".

Column 3, line 51, " $\lambda$ " should be " $\gamma$ ".

Column 3, line 51, " $\lambda$ " should be " $\gamma$ ".

Column 3, line 53, " $\lambda$ " should be " $\gamma$ ".

Column 4, line 1, "+ $\lambda$ " should be "+ $\gamma$ ".

Column 4, line 1, "- $\lambda$" should be "- $\gamma$".

Column 4, line 6, "(u-$\lambda$)" should be "(u-$\gamma$)".

Column 4, line 13, "cos(2$\pi\lambda$x)" should be "cos(2$\pi\gamma$x)".

Column 4, line 13, "sin(2$\pi\lambda$x)" should be "sin(2$\pi\gamma$x)".

Column 4, line 13, "$e^{i2\pi\lambda x}$" should be "$e^{i2\pi\gamma x}$".

Column 5, line 58, "nay" should be "any".

Column 6, line 49, "nay" should be "any".

Signed and Sealed this

Third Day of July, 1990

Attest:

HARRY F. MANBECK, JR.

*Attesting Officer*  *Commissioner of Patents and Trademarks*